Patented Sept. 25, 1945

2,385,736

UNITED STATES PATENT OFFICE 2,385,736

CAPACITOR CHARGING AND DISCHARGING CONTROL

Clyde E. Smith, Warren, Ohio, and Clarence E. Stadum, Wilkinsburg, Pa., assignors to Westinghouse Electric Corporation, East Pittsburgh, Pa., a corporation of Pennsylvania Application February 12, 1943, Serial No. 475,632

22 Claims. (Cl. 320—1)

This invention relates to a system for charging and discharging a capacitor and has particular relation to such apparatus as employed in a capacitor welder.

In prior capacitor welding systems of which we are aware, a capacitor is charged from an alternating-current source through a rectifier and is then discharged through the primary of a welding transformer. In some capacitor welders, the welding operations are performed singly, but in many welders a number of welding operations are performed in rapid succession as long as an operating switch, such as a push-button switch, remains closed.

The provision of a capacitor welder for commercial use, particularly one having repeating operation, is rather complex. The operation of the welder must be quite rapid, that is, the complete cycle of charging and discharging of the capacitor and initiation of recharging must be performed within a short time interval of the order of one-half second. The capacitor must, therefore, be charged rapidly. However, the potential charge must not overshoot (i. e. rise above and then decrease to the desired magnitude), nor should the potential charge rise to the desired magnitude and then creep to a slightly higher value or decrease because of current leakage. In other words, the capacitor must be charged rapidly to the desired potential magnitude and then maintained at a substantially constant potential until discharged.

The difficulty of accomplishing charging of the capacitor in this manner is increased because commercial conditions require a variable capacitor unit with a different potential charge for each capacitor setting. These may vary from 750 to 3000 volts for a capacitor of 120 to 2500 microfarads. There is, consequently, a tendency to overshoot the desired potential magnitude with certain capacitors and to creep above the desired magnitude with others. Moreover, the potential of any charged capacitor tends to decrease because of current leakage when completely cut off from the charging current source. Difficulty is also encountered because of the large transients which may arise upon initiation of rapid recharging of the discharged capacitor.

Once the capacitor is charged, it must be discharged through the welding transformer primary at the proper instant with respect to other operations such as the positioning of the welding electrodes. In addition, the charging and discharging circuits must be so related that recharging of the capacitor does not begin until the capacitor has been completely discharged but is initiated as soon as possible after the discharge is completed.

It is, accordingly, an object of our invention to provide a new and improved capacitor welder.

Another object of our invention is to provide apparatus for rapidly charging a capacitor to a desired magnitude.

A further object of our invention is to provide novel apparatus for rapidly charging a capacitor to a desired magnitude without overshooting.

Another object of our invention is to provide new and improved apparatus for rapidly charging a capacitor to a desired magnitude and thereafter maintaining the potential charge on the capacitor substantially constant.

A still further object of our invention is to provide apparatus for rapidly charging a capacitor to a desired magnitude without overshooting and thereafter maintaining the potential charge on the capacitor substantially constant.

It is another object of our invention to provide novel apparatus for charging and discharging a capacitor and initiating recharging thereof within a short interval of time.

Another object of our invention is to provide apparatus for charging and discharging a capacitor and initiating recharging thereof within a short period of time while avoiding undesirable transients.

An additional object of our invention is to provide apparatus for charging and discharging a capacitor and initiating recharging thereof within a short period of time in which the charging and discharging circuits are so inter-connected as to effect initiation of recharging immediately after the capacitor is discharged.

More specifically, it is an object of our invention to provide a capacitor welder including apparatus for charging and discharging a capacitor and initiating recharging thereof within a short interval of time while maintaining proper sequence relation with other operations of the welder, such as the positioning of the welding electrodes.

In accordance with our invention, the power capacitor is charged from a source of polyphase alternating current through a rectifier system. The rectifier system includes an electric discharge valve of the arc-like type, such as a thyratron, for controlling the flow of current from each phase of the source to the capacitor. These valves are rendered conductive at substantially the same instant early in each positive half period of the corresponding phase potentials until the potential charge on the capacitor attains a pre-selected magnitude slightly below the ultimate magnitude desired. As the potential charge on the capacitor increases above the preselected magnitude, the valves are rendered conductive gradually later in each succeeding positive half period of the corresponding phase potential until the ultimate desired magnitude is reached. The valves are prevented from becoming conductive when the capacitor potential is at the ultimate desired magnitude, and thus overshooting or creeping of the capacitor potential above the desired magnitude is avoided. However, should the capacitor potential decrease slightly because of a current leakage, the valves are rendered conductive very late in a positive half period of the corresponding phase potential to supply a small current to maintain the capacitor at the desired potential.

The instant in a positive half period of the corresponding phase potential at which any one of the valves is rendered conductive depends, of course, upon the characteristics of the potential impressed between the control electrode and cathode of the valve. A control circuit is provided for each valve and extends from the control electrode to the cathode. An alternating potential having a sloping wave front and displaced in phase with respect to the corresponding phase potential across the anode and cathode of the valve is impressed in each control circuit. This alternating potential is, however, superimposed on a second potential which remains substantially constant until the capacitor potential attains the preselected magnitude and then decreases rapidly. The magnitude of the second potential while it remains constant is such that the valve is rendered conductive early in a half period of the corresponding phase potential. The rate of decrease of the second potential is proportional to the rate of increase of the capacitor potential but is sufficiently rapid that the valve is not rendered conductive when the capacitor potential is at the ultimate desired magnitude.

The discharge circuit of the capacitor includes the primary of a welding transformer and an ignitron connected in series therewith. After the capacitor is charged to the ultimate desired magnitude, the series connected ignitron is rendered conductive, and the capacitor is discharged through the primary of the transformer. As the primary of the transformer is highly reactive, it tends to cause the capacitor to be charged in the inverse direction. To avoid such inverse charging, another ignitron is connected in shunt across the primary of the transformer. A firing circuit is provided to render the shunt connected ignitron conductive upon a change in polarity across the primary of the transformer. Thus, the current which would charge the capacitor inversely is shunted through the shunt connected ignitron. This arrangement also permits the series connected ignitron to become non-conductive as soon as, or very shortly after, the capacitor is completely discharged. Therefore, recharging of the capacitor can be initiated while current is still flowing from the primary of the transformer through the shunt connected ignitron.

As the magnitude of the second potential impressed in the control circuits of the rectifying valves is dependent upon the potential charge on the capacitor, it is apparent that these valves would ordinarily be rendered conductive as soon as the capacitor started to discharge. However, auxiliary means are provided to maintain the valves non-conductive for a predetermined time interval following the instant that the series connected ignitron is rendered conductive. This time interval is of such length as to permit the capacitor to be completely discharged, and thereafter the auxiliary means permits the valves to again become conductive. However, the valves are first rendered conductive very late in a positive half period of the corresponding phase potential and then gradually earlier in succeeding positive half periods until they are rendered conductive early in a positive half period. In this manner large transients are avoided. Thereafter the valves are rendered conductive at substantially the same instant early in each positive half period until the preselected capacitor potential magnitude is reached.

Another auxiliary means is provided which becomes effective at the instant the shunt connected ignitron is rendered conductive to initiate operation of sequence control and timing means which maintain proper relation between the charging and discharging operations as well as other operations of the welder, such as the positioning of the electrodes.

The novel features which we consider characteristic of our invention are set forth with particularity in the appended claims. The invention itself, however, both as to organization and its method of operation, together with additional objects and advantages thereof, will best be understood from the following description of specific embodiments when read in connection with the accompanying drawings, in which:

Figures 1, 2:
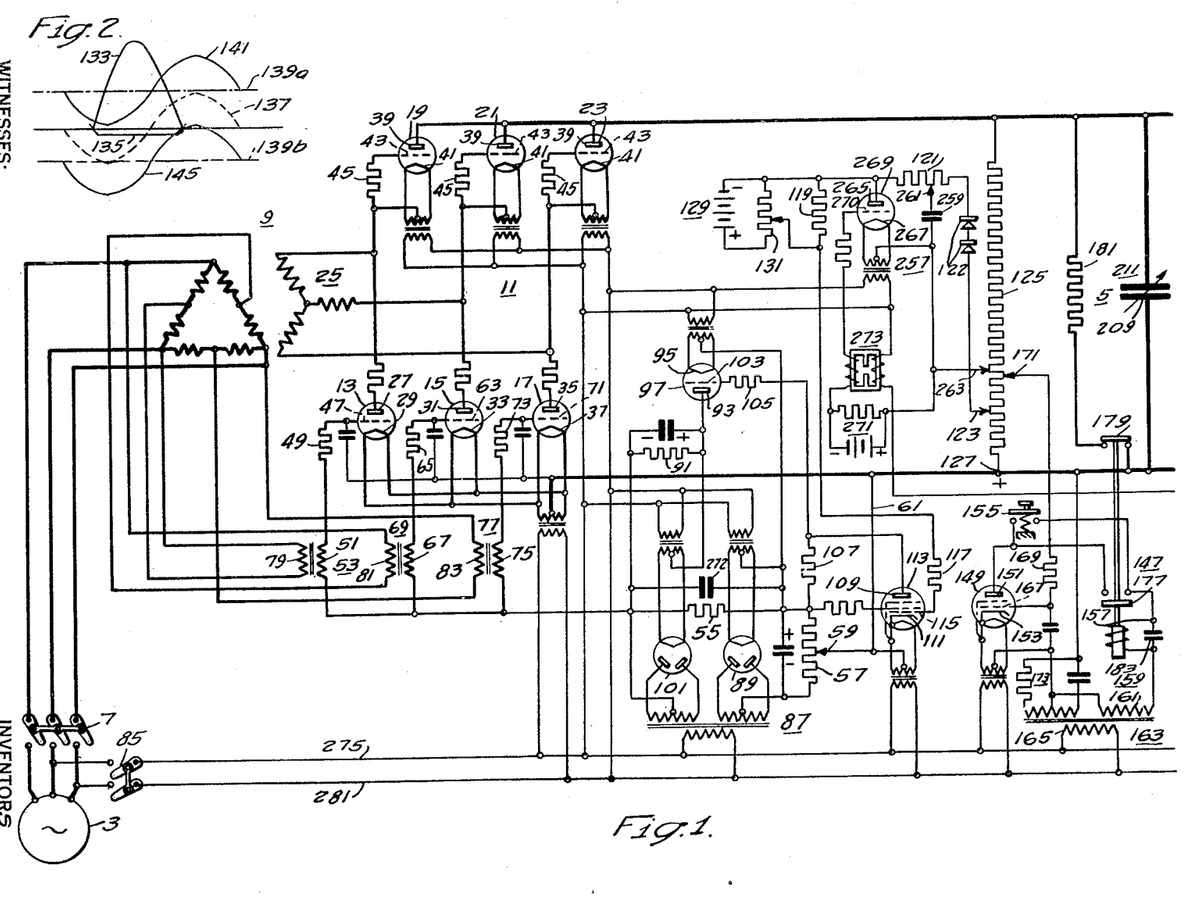
Figures 1 and 1A show the circuit connections of a capacitor welder embodying our invention.
Fig. 2 is a graph illustrating the operation of a rectifier valve.
Figure 1A:
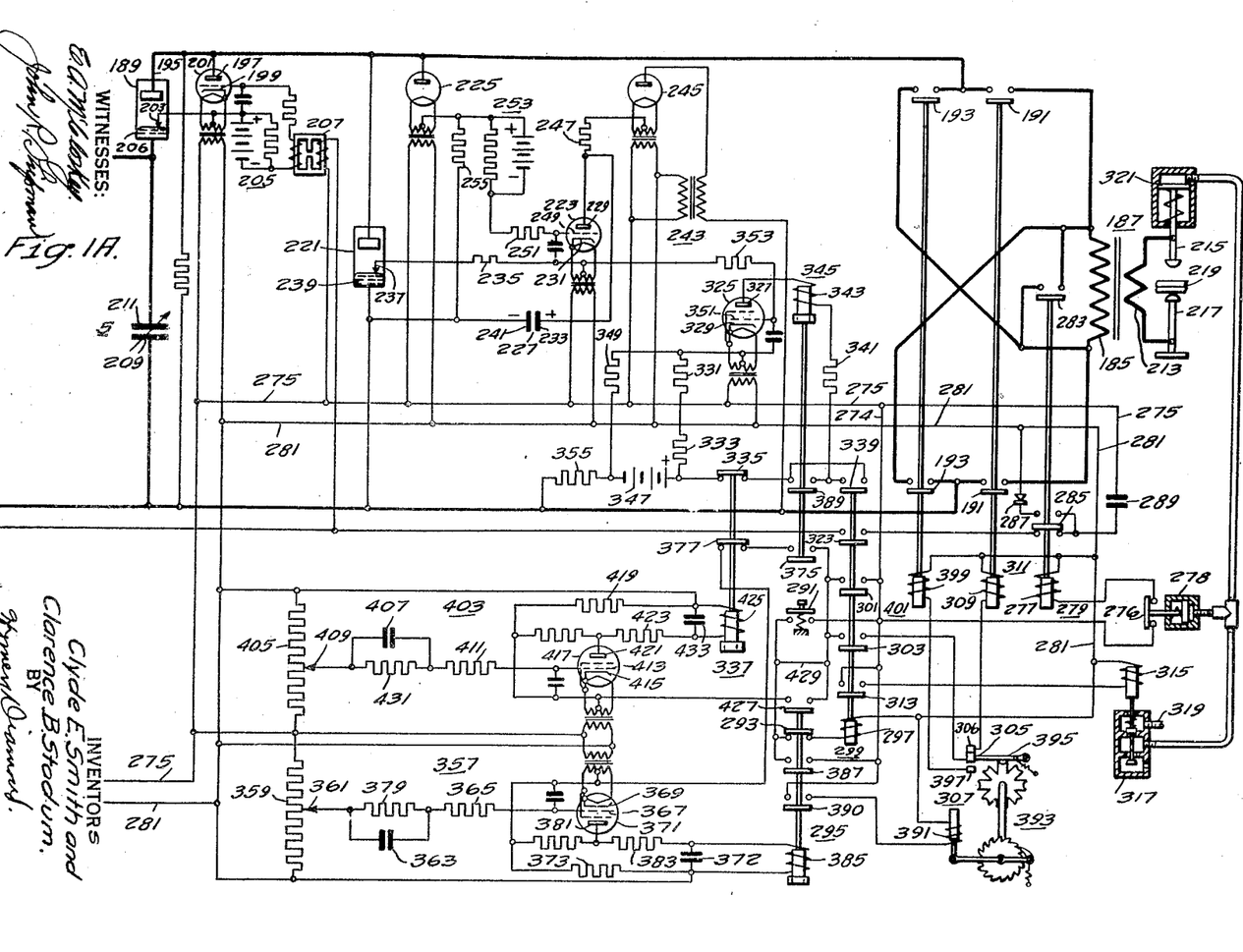

As shown in the drawings, a source 3 of three-phase alternating current is employed to supply charging current to power capacitors 5 through a circuit breaker 7, a polyphase transformer 9, and a rectifying system 11. The rectifying system 11 includes a plurality of electric discharge valves 13, 15, 17, 19, 21 and 23 of the arc-like type. These valves are connected in a well known manner so that current flows from the secondary windings 25 of the transformer 9 through the anodes and cathodes 27 and 29, 31 and 33, and 35 and 37 of valves 13, 15 and 17 to the capacitors 5 and then through the anodes and cathodes 39 and 41, of valves 19, 21, and 23 back to the secondary windings. The grid 43 of each of valves 19, 21 and 23 is connected through a resistor 45 to its cathode 41 so that these valves are conductive whenever current is conducted through valves 13, 15 and 17. In other words, the flow of charging current is under the complete control of valves 13, 15 and 17, each of which controls current of a different one of the three phases.

The control circuit of valve 13 may be traced from the grid 47 thereof through a grid resistor 49, a secondary 51 of a transformer 53, a resistor 55, a portion of a voltage divider 57 to the intermediate tap 59 thereof, and from the intermediate tap through conductor 61 to the cathode 29 of the valve 13. The control circuit of valve 15 may be similarly traced from its grid 63 through a grid resistor 65, a secondary 67 of another transformer 69, the resistor 55, a portion of the divider 57 to the intermediate tap 59 thereof, and from the intermediate tap 59 to the cathode 33 of the valve 15. The control circuit of valve 17 may also be traced from its grid 71 through a grid resistor 73, a secondary 75 of still another transformer 77, the resistor 55, a portion of the divider 57 to the intermediate tap 59, and from the intermediate tap 59 to the cathode 37. It is thus apparent that the resistor 55 and portion of the divider 57 are common to the control circuits of all three valves 13, 15 and 17.

The primaries 79, 81 and 83 of the three transformers 63, 69 and 77, the secondaries of which are included in the control circuits of valves 13, 15 and 17, are energized from the source 3 in such manner that the potential impressed by each of the transformers in the corresponding control circuit is an alternating one lagging in phase 120° behind the phase potential impressed between the anode and cathode of the corresponding valve. A substantially constant potential is also impressed in the control circuit of each of valves 13, 15 and 17 by the divider 57 which is energized from the source 3 through another circuit breaker 85, an auxiliary transformer 87 and a full-wave rectifier 89.

Another resistor 91 is connected in series with the anode 93 and cathode 95 of the high-vacuum discharge valve 97 across the resistor 55 in the control circuit of the valves 13, 15 and 17. A substantially constant potential appears across this resistor 91 and is supplied from the source 3 through auxiliary transformer 87 and a full-wave rectifier 101. The control circuit of the high-vacuum valve 97 extends from the grid 103 thereof through a grid resistor 105 and another resistor 107 to the cathode 95. The resistor 107 is also connected in series with the anode 109 and cathode 111 of another electrical discharge valve 113 between the positive terminal of the divider 57 and the intermediate tap 59. The valve 113 is illustrated as a pentode, such as the R. C. A. 6C6 tube, although any suitable amplifying tube may be employed. When the pentode 113 is conductive, current flows through its output circuit including the resistor 107 in the control circuit of the high-vacuum valve 97 to develop a potential thereacross. The polarity of the potential across the resistor 107 is such that when the potential magnitude is low, the high-vacuum valve 97 conducts a large current to develop a large potential across the resistor 55 in the control circuit of the valves 13, 15 and 17. When the potential magnitude across the resistor 107 is high, current flow through the high-vacuum valve 97 is greatly reduced so that only a small potential is developed across the resistor 55. Thus, it is apparent that the total potential impressed in the control circuit of the valves 13, 15 and 17 by the resistor 55 and the divider 57 varies in accordance with the magnitude of the current flowing through the pentode 113.

A control circuit is provided for the pentode 113 which extends from the control electrode 115 through three resistors 117, 119, and 121, rectifiers 122 to an intermediate tap 123 on a voltage divider 125 and from the end terminal 127 of the divider to the cathode 111. The voltage divider 125 is connected across the main capacitors 5 so that the potential impressed in the control circuit of the pentode 113 by the divider 125 is proportional to the potential charge on the capacitor 5. The polarity of the potential impressed by the divider is such that it tends to maintain the control electrode 115 of the pentode 113 negative with respect to the cathode 111. However, a potential of opposite polarity is impressed across the second resistor 119 in the control circuit from an auxiliary source of direct-current potential 129 and a potentiometer 131 for adjusting the magnitude of the impressed potential.

While the charge on the capacitors 5 is such that the potential impressed in the control circuit of the pentode by the divider 125 is less than the potential across the resistor 119, a current flows from the control electrode 115 to the cathode 111 of the pentode 113 and through the control circuit thereof. The dimensions of the resistors 117 and 121 in the control circuit are such that the potential developed thereacross by the current flowing in the control circuit added algebraically to the potentials impressed in the control circuit by the resistor 119 and the divider 125 maintain the potential between the control electrode 115 and cathode 111 substantially constant with different potentials impressed by the divider less than the potential across resistor 119. However, when the potential supplied by the divider in the control circuit equals the potential across the resistor, current flow through the control circuit is halted. Thereafter the potential impressed by the divider continues to increase, and the potential between the control electrode and cathode of the pentode is varied accordingly in a negative direction. As a result, the current flowing in the output circuit of the pentode remains substantially constant until the capacitor potential attains the predetermined magnitude at which the potential impressed by the divider in the control circuit equals the potential across the resistor and thereafter this current decreases in accordance with the increase in the capacitor potential.

The effect of the described variation in the flow of current in the output circuit of the pentode 113 upon the valves 13, 15, and 17 may be best be understood by reference to Fig. 2. In Fig. 2, the anode-cathode potential of one of the valves 13 during a positive half period is shown at 193. The critical value of potential which must be applied between the grid and cathode of the valve to render it conductive is shown at 195. The alternating potential impressed in the control circuit of valve 13 is illustrated by a dotted line 197, and the potential impressed in the control circuit by the resistor 55 and divider 57 is illustrated by dot-dash lines 199a and 199b. As previously pointed out, when the magnitude of the current flow in the output circuit of the pentode 113 is low, the potential impressed in the control circuit by the resistor 55 and divider 57 is high in a positive direction as at 199a. The resultant potential between the grid 47 and cathode 49 of the valve 13 is then shown by a solid line 201, and it is apparent that it be above the critical potential 195 of the valve early in the half period.

When the current flowing in the output circuit of the pentode 113 is high, the potential impressed in the control circuit of the valve by the resistor 55 and divider 57 is low with respect to a positive direction as at 199b. The resultant potential is then shown at 105. It is apparent that the resultant potential 105 rises above the critical potential 195 of the valve very late in the half period, and if the potential impressed by the resistor 55 and divider 57 is even lower, the resultant potential will not rise above the critical potential at all and the valve will remain non-conductive.

The power capacitors 5 may be a bank of capacitors or a single capacitor as desired and the effective dimensions of the capacitor or capacitors may be variable, if desired. In any case, the potential impressed across the resistor 119 in the control circuit of the pentode 113 must be set according to the ultimate potential charge to be placed on the capacitors 5.

An overvoltage protective device 147 is also provided to prevent overcharging of the capacitors 5 should a failure occur in the charging system. This protective device includes an electric discharge valve 149 of the arc-like type having an anode 151 and cathode 153 connected in series with a push-button switch 155, the energizing coil 157 of a relay 159, and the secondary 161 of an auxiliary transformer 163 whose primary 165 is energized from the source 3. The control circuit of the valve 149 extends from the grid 167 through a grid resistor 169 to an intermediate tap 171 on the voltage divider 125 and from the positive terminal 127 of the divider through a phase shifting circuit 173 energized from the source 3 through the auxiliary transformer 163 and thence to the cathode 153 of the valve. The phase shifting circuit 173 is arranged to impress an alternating potential leading by approximately 90° in phase the anode-cathode potential of the valve 149.

When the push-button switch 155 is closed, the valve 149 is immediately rendered conductive at the beginning of the positive half period of the source. As a result, the relay 159 is energized, closing its contactor 177 which completes a holding circuit around the push-button switch 155. A second contactor 179 of the relay 159 is connected in series with a resistor 181 across the main capacitors 5 to form an emergency discharge circuit therefor. As long as the relay 159 is energized, the second contactor 179 remains open. The valve 149 is then conductive in each positive half period, and a capacitor 183 connected in shunt with the energizing coil 157 of the relay 159 maintains the relay energized during the intervening negative half periods. However, should the potential charge on the capacitors 5 rise to a dangerous magnitude, the potential impressed in the control circuit of the valve 149 by the divider 125 becomes sufficiently negative to prevent the valve 149 from being rendered conductive, in a positive half period. The relay 159 would then be deenergized, closing the emergency discharge circuit across the capacitor 5.

The primary 185 of a welding transformer 187 is connected across the capacitors 5 through an ignitron 189 and reversing contactors 191 or 193. As will be explained hereinafter, one or the other of the sets of reversing contactors 191 or 193 is closed during each welding operation.

A firing circuit for the ignition 189 in series with the welding transformer 187 is provided and includes a circuit extending from the anode terminal 195 of the ignitron through the anode 197 and cathode 199 of another electric discharge firing valve 201 to the igniter 203 of the ignitron. The control circuit of the firing valve 201 includes a biasing potential source 205 tending to maintain the valve 201 nonconductive and an impulse transformer 207 for supplying a potential impulse to render the valve 201 conductive. When the firing valve 201 is rendered conductive, current flows from the positive plates 209 of the capacitors 5 through the primary 185 of the welding transformer 187, the anode 197 and cathode 199 of the firing valve 201 and the igniter 203 and cathode 206 of the ignitron 189 to the negative plates 211 of the capacitors 5. As a result, the ignitron 189 is immediately rendered conductive and the capacitors 5 discharge through the primary 185 of the transformer 187. The secondary 213 of the transformer 187 is connected across the welding electrodes 215 and 217 which are at that time in engagement with the material 219 to be welded.

Another ignitron 221 is connected in shunt across the primary 185 of the welding transformer 187. Firing of this ignitron 221 is controlled by another electric discharge firing valve 223 of the arc-like type, which, in turn, is controlled by a small rectifier tube 225. An auxiliary capacitor 227 is connected across the anode 229 and cathode 231 of the firing valve 223 in a circuit which may be traced from the positive plate 233 of the capacitor 227 through the anode 229 and cathode 231 of the firing valve 223, a resistor 235, igniter 237 and cathode 239 of the ignitron 221 to the negative plate 241 of the capacitor 227. The auxiliary capacitor 227 is originally charged from the source 3 through an auxiliary transformer 243, a rectifier 245 and a resistor 247.

The control circuit of the firing valve 223 may be traced from the grid 249 through a grid resistor 251, a source of substantially constant biasing potential 253, a resistor 255, and the cathode 239 and igniter 237 of the ignitron 221 to the cathode 231 of the valve. The resistor 255 is also connected across the primary 185 of the welding transformer 187 through the small rectifying tube 225. When the main capacitors 5 discharges through the welding transformer primary 185, the reactance of the primary tends to maintain the flow of current. In other words, after the capacitor potential decreases to zero, the decay of flux in the primary 185 causes the polarity of the potential across the primary to reverse, and, therefore, the current continues to flow from the primary in the same direction in the capacitor discharge circuit. Ordinarily this would cause the power capacitors 5 to be charged inversely. However, after the polarity of the potential across the primary 185 reverses, the small rectifying tube 225 breaks down with but a very small inverse charge on the main capacitor and becomes conductive. Current immediately flows through the resistor 225 in the control circuit of the firing valve 223, and the potential developed thereacross renders the firing valve 223 conductive. The auxiliary capacitor 227 discharges through the firing valve 223 and the igniter 237 of the ignitron 221 connected in shunt with the primary 185 of the welding transformer 187. This shunt connected ignitron 221 is immediately rendered conductive, and the current flowing from the primary 185 of the transformer 187 passes therethrough. In this manner, substantial inverse charging of the power capacitors 5 is prevented. When the shunt ignitron becomes conductive the potential across the series connected ignitron 189 is greatly reduced so that it becomes non-conductive. The discharge circuit for the power capacitors 5 is thus again opened and in condition to permit recharging of the capacitors.

Because the pentode 113 is responsive to the charge on the power capacitors 5, the initiation of the capacitor discharge through the welding transformer 187 would ordinarily cause the valves 13, 15, and 17 to again become conductive while the capacitors 5 are still discharging. Such a condition is obviously undesirable, and to avoid it, a timing circuit 257 is provided to maintain the pentode 113 non-conductive while the capacitors 5 are being discharged. The timing circuit 257 includes an auxiliary capacitor 259 arranged to be charged simultaneously with the power capacitors 5 by a circuit extending from the intermediate tap 123 on the divider 125 through the rectifiers 122, a portion of the resistor 121 to the intermediate tap 261 thereon and from the intermediate tap 261 through the capacitor 259 to another intermediate tap 263 on the divider 125. A discharge circuit for the auxiliary capacitor 259 extends therefrom through intermediate tap 261, another portion of the resistor 121, the anode 265 and cathode 267 of another electric discharge valve 269 of the arc-like type and back to the capacitor. The valve 269 is normally maintained non-conductive by a biasing potential impressed between the grid 270 and cathode 267 thereof from a source 271. Thus the auxiliary capacitor 259 is charged simultaneously with the main capacitor 5.

A potential impulse is supplied to counteract the biasing potential 271 through an impulse transformer 273 at the same instant that the firing valve 201 for the series connected ignitron 109 is rendered conductive. As the auxiliary capacitor 259 discharges, the current flow through the portion of the resistor 121 develops a potential thereacross of such polarity and magnitude that the current flowing in the output circuit of the pentode 113 is such that the valves 13, 15 and 17 are maintained non-conductive for a predetermined interval of time. The length of this interval is sufficient to permit power capacitors 5 to be completely discharged. Thereafter the current flow through the portion of the resistor 121 decreases so that the valves 13, 15, and 17 are first rendered conductive late in a positive half period and then gradually earlier in each succeeding positive half period. In this manner, undesirable transients which would otherwise occur upon the initiation of recharging of the discharged capacitors 5 are avoided. Moreover, the rate of decrease of current through the resistor 121 is sufficiently rapid so that the valves 13, 15 and 17 are quickly advanced to the point where they are rendered conductive early in each positive half period to supply maximum charging current. In addition, a capacitor 272 may be connected across the resistor 55 to tend to maintain the potential across the resistor 55 and thus render the advancement of the instant of conductivity of the valves more gradual if desired. The valve 269 in the discharge circuit of the auxiliary capacitor 259, of course, becomes non-conductive as soon as the auxiliary capacitor 259 is discharged below the arc drop of the valve.

To initiate a series of welding operations, the circuit breakers 7 and 95 are first closed. Current then flows from the source 3 through the polyphase transformer 9 and the rectifying valves 13, 15, 17, 19, 21 and 23 to charge the power capacitors 5. The controlling rectifying valves 13, 15 and 17 are rendered conductive early in each positive half period so that maximum current is supplied to charge the capacitors 5 until the capacitor potential attains a preselected magnitude. Thereafter the valves are rendered conductive gradually later in each succeeding positive half period to supply a gradually decreasing charging current until the capacitor potential reaches the ultimate desired magnitude. The valves 13, 15 and 17 are then prevented from becoming conductive unless the capacitor potential is decreased by a current leakage, under which circumstances the valves are again rendered conductive late in a positive half period to supply a small charging current. This small charging current is effective to maintain the capacitor potential at the desired magnitude.

When the circuit breakers 7 and 95 are closed, current also flows in the circuit extending from the source 3 through a conductor 275, conductor 274, the contactor 276 of a head switch 278, the energizing coil 277 of a relay 279, and a conductor 281 to the source. Contactor 283 of relay 279 closes a short circuit across the primary 185 of the welding transformer 187. Contactor 285 of relay 279 completes a circuit from the source 3 through conductor 281, a dry rectifier 287, the contactor 285, a capacitor 289, and conductor 275 to the source. The resulting charge on the capacitor 289 is later employed to energize impulse transformers 207 and 273.

A starting push-button switch 291 is then closed, completing a circuit from the source 3 through conductors 275 and 274 the push-button switch 291, contactor 293 of time delay relay 295, energizing coil 297 of relay 299, and conductor 281 to the source. When relay 299 is energized, its contactor 301 closes a holding circuit around the push-button switch 291. Contactor 303 completes a circuit from the source 3 through conductor 274, contactors 301 and 303 of relay 299, contactors 305 and 306 of relay 307, energizing coil 309 of relay 311, and conductor 281 to the source. As a result, relay 311 is energized closing its contactors 191 connecting the welding transformer 187 in circuit with the main capacitors 5.

Contactor 313 is also closed when relay 299 is energized and completes a circuit from the source 3 through conductor 274, contactor 313 of relay 299, energizing coil 315 of a hydraulic valve 317, and conductor 281 to the source. When the coil 315 of the hydraulic valve 317 is energized, hydraulic pressure is supplied from inlet 319, through the valve 317 to a piston 321 upon which one of the welding electrodes 215 is mounted. The other welding electrode 217 is stationary, and the hydraulic pressure forces the movable electrode 215 downward, so that the material 219 to be welded is clamped between the two electrodes. When the movable electrode 215 engages the material, the hydraulic pressure opens the head switch contactor 276 in series with the energizing coil 277 of relay 279.

When relay 279 is deenergized, the auxiliary capacitor 259 is connected across the impulse transformers 207 and 273 through contactor 285 of relay 279 and contactor 323 of relay 299. The potential impulse supplied through impulse transformer 207 renders the ignitron 109 in series with the welding transformer 187 conductive to discharge the main capacitors 5 therethrough. At the same time, the potential supplied through transformer 273 initiates operation of the timing circuit 257 which prevents the valves 13, 15, and 17 from becoming conductive while the capacitors 5 are being discharged.

As the capacitor 5 is discharged, its potential drops to zero, whereupon the decay of flux in the primary 185 of the welding transformer 187 produces a change in polarity of the potential across the primary 185 and cause the flow of current to continue. However, upon a very small inverse charge across the power capacitors 5, the rectifying tube 225 becomes conductive, causing the shunt connected ignitron 221 to be rendered conductive. The shunt connected ignitron 221 then conducts the current produced by the decay of flux in the primary 185, preventing any substantial inverse charging of the capacitors 5 and permitting the series connected ignitron 189 to become non-conductive.

Another electric discharge valve 325 of the arc-like type has its anode 327 and cathode 329 connected across a pair of resistors 331 and 333 through a normally closed contactor 335 of time delay relay 337, contactor 339 of relay 299, another resistor 41, and the energizing coil 343 of another time delay relay 345. A direct-current potential is impressed across the pair of resistors 331 and 333 from an auxiliary source 347 through another resistor 349. The control circuit of the valve 325 extends from the grid 351 through a grid resistor 353, resistor 235, the igniter 237 and cathode 239 of the shunt connected ignitron 221 and resistors 355 and 349 to the cathode 329. The potential across the resistor 349 from source 347 ordinarily maintains the valve 325 non-conductive. However, when firing current is passed through the igniter 237 of the ignitron 221, the momentary high potential across the igniter 237 and resistor 235 developed by the current flow therethrough causes the valve 325 to become conductive, energizing time delay relay 345.

Another timing circuit 357 is provided to maintain the welding electrodes in engagement with the material for an interval of time following the discharge of the capacitators 5 which is commonly known in the welding art as the hold time. The hold-time circuit comprises a potentiometer 359 connected directly across the source 3. When the circuit breaker 85 is originally closed, current flows from the source 3 through conductor 275, a portion of the potentiometer 359 to an intermediate tap 361 thereon, and from the intermediate tap 361 through a capacitor 363, a resistor 365, the grid 367 and cathode 369 of an electric discharge valve 371 of the arc like type and another resistor 373 and conductor 281 to the source. As the grid 367 and cathode 369 of the valve 371 act as a rectifier, the capacitor 363 is thus in a charged condition.

When the time delay relay 345 is energized, its contactor 375 completes a circuit from the cathode 369 of the valve 371 of the hold-timing circuit 357 through contactor 377 of relay 337, contactor 375 of relay 345, and contactor 301 of relay 299 to conductor 275. Thus, the potential of the source is removed from the auxiliary capacitor 363 which discharges through a resistor 379 connected in parallel therewith. The anode 381 of the valve 371 is connected through a resistor 383 and the energizing coil 385 of time delay relay 295 and conductor 281 to the source. Then when contactor 375 of relay 345 closes, the source 3 is connected across the anode 381 and cathode 369 of the valve 371. However, the polarity of the charge across the auxiliary capacitor 363 maintains the valve non-conductive. After a predetermined time interval, the length of which is determined by the rate of discharge of the capacitor 363, the potential across the capacitor 363 decreases to a magnitude permitting the valve 371 to become conductive in each half cycle in which its anode 381 is positive. Current flowing through the valve 371 then energizes relay 295, and a capacitor 372 maintains the relay energized in the intervening negative half periods.

When relay 295 is energized, its contactor 301 closes an additional holding circuit around the push-button switch 291. Contactor 293 of relay 295 opens the circuit through the energizing coil 297 of relay 299. When relay 299 is thus deenergized, its contactor 339 opens, but contactor 389 of relay 345 maintains the anode circuit of the valve 325 closed; contactor 323 of relay 299 opens the circuit through impulse transformers 207 and 270; contactor 301 opens the holding circuit around push button switch 291 but another holding circuit is already closed through contactor 387 of relay 295; contactor 303 opens the energizing circuit of relay 311; and contactor 313 opens the energizing circuit of the hydraulic valve 317. When the hydraulic valve 317 is deenergized, the head switch contactor 276 is closed, and the movable electrode 215 is soon thereafter raised out of engagement with the material 219 to be welded. Closing the head switch contactor 276 energizes the relay 279 whose contactor 283 closes a short circuit across the primary 185 of the transformer 187 to prevent arcing at the electrode 215 when it is raised out of engagement with the material 219. Contactor 285 of relay 279 closes the charging circuit of the auxiliary capacitor 289.

Energization of relay 295 also closes contactor 390 which completes a circuit from the source 3 through conductor 274, contactor 360, energizing coil 391 of relay 307 and conductor 281 to the source. Relay 307 includes a ratchet and cam system 393 for operating contactor arm 395. The arrangement is such that starting with the contactor arm 395 in the position shown with contacts 305 and 306 engaged, energization of the relay coil 391 causes the arm 395 to be lowered opening the circuit through contacts 305 and 306 and closing the circuit through contacts 305 and 397. Thus relay 311 is deenergized, opening contactors 191 and the coil 399 of relay 401 is energized, closing contactors 193. Contacts 305 and 397 remain in engagement until relay 307 is deenergized and energized again. When relay 307 is energized again, the circuit through contactors 305 and 397 is opened and the circuit through contactors 305 and 306 is closed. Since relay 307 is not energized again until after another welding operation, it is apparent that contactors 191 are closed for one weld and contactors 193 are closed for the next weld. As the current flowing from capacitors 5 passes through the primary 185 in one direction with contactors 191 closed and in the opposite direction with contactors 193 closed, saturation of the transformer 187 is avoided.

Another timing circuit 403, designated the off-time circuit, and similar in nature to the hold-time circuit 357, is also provided. The off-time circuit 403 comprises a potentiometer 405 energized from the source 3 and an auxiliary capacitor 407 originally charged from the source in a circuit extending from the source through conductor 275, a portion of the potentiometer 405, to the intermediate tap 409, the auxiliary capacitor 407, a resistor 411, the grid 413 and cathode 415 of another electric discharge valve 417 of the arc like type and resistor 419 to conductor 281. The anode 421 of the valve 417 is also connected to conductor 281 through a resistor 423 and the energizing coil 425 of time delay relay 337.

When relay 295 is energized by the hold-timing circuit 357, its contactor 427 closes a circuit from the cathode 415 of the valve 417 through contactor 427, a conductor 429, contactor 387 of relay 295 to conductor 275. Thus, the source potential is impressed across the anode 421 and cathode 415 of the valve 417. However, the polarity of the charge on the auxiliary capacitor 407 is such that the valve 417 is maintained non-conductive.

When contactor 427 is closed upon energization of relay 295, the source potential is removed from the auxiliary capacitor 407, which then discharges through a resistor 431 in shunt therewith. After a predetermined interval of time determined by the rate of discharge of the auxiliary capacitor 407, the potential on the capacitor 407 decreases permitting the valve 417 to become conductive in each half period of the source in which its anode 421 is positive to energize relay 337. A capacitor, 433 in shunt with coil 425 of the relay 337 maintains it energized during the intervening negative half periods.

When relay 337 is energized, its contactor 335 opens the anode circuit of valve 325, causing relay 345 to be denergized. Contactor 377 of relay 337 opens the cathode circuit of the discharge valve 371 in the hold-timing circuit 357 to render the valve 371 non-conductive. As a result, relay 295 is deenergized.

Upon deenergization of relay 295, the welding aparatus is in the same condition as it was when the push button switch 291 was first closed with the exception that the circuit through contact 305 is arranged to effect closure of contactors 193 instead of contactors 191. If the push button switch 291 is still closed another welding operation takes place. It is to be noted that during a welding operation, the contactor 301 of relay 299 and contactor 387 of relay 295 complete holding circuits around the push button switch 291. These holding circuits insure a complete welding operation even though the push button switch may be opened in the middle of the operation. Therefore, welding operations continue to take place in rapid succession as long as push button switch 291 is held in closed position but the succession of welding operations is halted upon the completion of the next welding operation following opening of the push button switch.

The sequence of events during repeated operations of the welder may be briefly summarized. Assuming circuit breakers 1 and 85 are closed so that main capacitor 5 is charged and relay 279 is energized so that auxiliary capacitor 289 is charged, closure of push button switch 291 first causes contactors 191 to close and electrode 215 to be moved downward into engagement with the material 219 to be welded. Immediately thereafter the head switch 278 operates to deenergize relay 279 so that auxiliary capacitor 289 discharges through impulse transformers 207 and 273. Transformer 273 then initiates operation of the timing circuit 257 to prevent a supply of charging current to the main capacitors 5 for a predetermined interval of time. At the same instant transformer 207 causes the series ignitron 189 to become conductive and the main capacitor 5 is discharged through the welding transformer 187 effecting a welding of the material 219.

As the potential of capacitors 5 drops to zero, the decay of flux in primary 185 tends to produce a current to charge the capacitors 5 inversely. However, before a substantial inverse charging can be effected, rectifier tube 225 breaks down causing the shunt ignitron 221 to become conductive. When the shunt ignitron 221 becomes conductive the series ignitron 189 becomes non-conductive.

Just after the series ignitron becomes non-conductive, the timing circuit 257 allows the controlling rectifying valves 13, 15 and 17 to become conductive late in a half period of the corresponding phase potential to initiate charging of the capacitor 5 while avoiding large transients. The instant in a positive half period at which the valves 13, 15 and 17 become conductive is rapidly advanced in the next few successive positive half periods until maximum charging current is supplied to the capacitor. The valves 13, 15 and 17 are then rendered conductive at substantially the same instant early in each successive positive half-period until the capacitors 5 are charged to a preselected magnitude. Thereafter the valves 13, 15 and 17 are rendered conductive gradually later in each successive positive half period to supply a gradually decreasing charging current until the capacitor potential attains the ultimate desired magnitude, at which point the valves fail to become conductive. Should the capacitor potential decrease before the series ignitron becomes conductive the valves 13, 15 and 17 are rendered conductive late in a half period to supply a small charging current to maintain the capacitor potential at the ultimate desired magnitude.

While the capacitors 5 are being recharged other circuits are reconditioning the discharge circuit. When the shunt ignitron 221 becomes conductive, valve 325 is rendered conductive to energize relay 345 and initiate operation of the hold time circuit 357. After the shunt ignitron 221 is rendered conductive the welding electrodes 215 and 217 are held in engagement with the material 219, in accordance with well-known welding practice, for a time interval known as the hold-time and the length of which is here determined by the hold-time circuit 357. At the expiration of the hold-time period the electrode 15 is raised out of engagement with the material 219, the primary 185 of the welding transformers having been short circuited just prior thereto by contactor 283 to avoid arcing at the electrode.

The elctrodes are kept out of engagement with the material 219 for a time interval known as the off time and measured by the off-time circuit 403. The off time period is just long enough to permit the operator to position the material 219 for the next weld. At the expiration of the off-time period, the capacitors 5 are recharged, the material 219 is in position for a new weld, auxiliary capacitors 289 is charged and the relays are in the same condition as at the beginning of the first weld though in the meantime contactors 191 have been opened and contactors 193 closed to avoid saturation of the welding transformer. If the push button switch is still closed, a new weld is then made.

In a system actually constructed and tested as shown, WL-677 thyratrons were employed as rectifying valves 13, 15, 17, 19, 21 and 23. An R. C. A. 2A3 high-vacuum tube was employed as valve 97, and an R. C. A. 6C6 pentode was used as the amplifying tube 113. The resistor 14 had a resistance of 1 million ohms; resistor 25 had a resistance of 10,000 ohms, a potential of 32 volts was impressed across resistance 119 and the capacitor 259 had a capacitance of 5 microfarads. Westinghouse WL688 ignitrons were employed as the series and shunt connected ignitrons 189 and 221 in the discharge circuit of the capacitors 5. The firing valves 201 and 223 for the ignitrons 189 and 221 were Westinghouse WL-677 thyratrons, and the rectifiers 225 and 245 were R. C. A. 866-A tubes. A Westinghouse WL-630 thyratron was employed as valve 325; a similar tube was employed as valve 167; and a Westinghouse KU-627 thyratron was used as valve 269.

Although we have shown and described certain specific embodiments of our invention, we are fully aware that many modifications thereof are possible. Our invention, therefore, is not to be restricted except insofar as is necessitated by the prior art and by the spirit of the appended claims.

We claim as our invention:

1. In combination, a capacitor, means adapted to function as a source of periodically pulsating potential in circuit with said capacitor for supplying charging current thereto, electric discharge valve means of the arc-like type interposed between said source and capacitor for controlling the supply of charging current to said capacitor, control means connected to said valve means for rendering said valve means conductive at substantially the same instant early in each positive pulsation of said source, and means associated with said control means and responsive to the potential charge on said capacitor for causing said control means to render said valve means conductive at an instant gradually later in each succeeding positive pulsation as said capacitor potential increases above a preselected magnitude.

2. In combination, a capacitor, means adapted to function as a source of periodically pulsating potential in circuit with said capacitor for supplying charging current thereto, electric discharge valve means of the arc-like type interposed between said source and capacitor for controlling the supply of charging current to said capacitor, a control circuit connected to said valve means and arranged to render said valve means conductive when a potential greater than a predetermined critical value is impressed therein in a positive pulsation of said source, and means responsive to the potential charge on said capacitor for impressing in said control circuit a potential which first rises above said critical value at substantially the same instant early in each positive pulsation while the capacitor potential is below a preselected magnitude and at an instant gradually later in each succeeding positive pulsation as the capacitor potential increases above said preselected magnitude.

3. In combination, a capacitor, means adapted to function as a source of periodically pulsating potential in circuit with said capacitor for supplying charging current thereto, electric discharge valve means of the arc-like type interposed between said source and capacitor for controlling the supply of charging current to said capacitor, a control circuit connected to said valve means and arranged to render said valve means conductive when a potential greater than a predetermined critical value is impressed therein in a positive pulsation of said source, and means adapted to impress in said control circuit a second periodic potential of the same periodicity as said source potential and having a sloping wave front superimposed on a third potential which is substantially constant while the capacitor potential is below a preselected magnitude and which gradually decreases as the capacitor potential increases above said preselected magnitude, the magnitude of said second and third potentials being such that the resultant potential in said control circuit first rises above said critical value at substantially the same instant early in each positive pulsation while said third potential is constant and at an instant gradually later in each succeeding positive pulsation as said third potential decreases.

4. In combination, a capacitor, means adapted to function as a source of periodically pulsating potential in circuit with said capacitor for supplying charging current thereto, electric discharge valve means of the arc-like type interposed between said source and capacitor for controlling the supply of charging current to said capacitor, a control circuit connected to said valve means and arranged to render said valve means conductive when a potential greater than a predetermined critical value is impressed therein in a positive pulsation of said source, and means adapted to impress in said control circuit a second periodic potential of the same periodicity but displaced in phase relative to said source and having a sloping wave front superimposed on a third potential which is substantially constant while the capacitor potential is below a preselected magnitude and which gradually decreases as the capacitor potential increases above said preselected magnitude.

5. In combination, a capacitor, means adapted to function as a source of periodically pulsating potential in circuit with said capacitor for supplying charging current thereto, electric discharge valve means of the arc-like type interposed between said source and capacitor for controlling the supply of charging current to said capacitor, a control circuit connected to said valve means and arranged to render said valve means conductive when a potential greater than a predetermined critical value is impressed therein in a positive pulsation of said source, and means adapted to impress in said control circuit a second potential which first rises above said critical value at substantially the same instant early in each positive pulsation while the potential charge on said capacitor is below a preselected magnitude and at an instant gradually later in each succeeding positive pulsation as the capacitor potential increases above said preselected magnitude, the rate of change of the instants at which said valve means is rendered conductive being dependent upon the rate of increase of said capacitor potential, said potential impressing means including means associated with said capacitor and effective to amplify changes in the capacitor potential above said preselected magnitude only.

6. For use in charging a capacitor to a potential of a preselected magnitude from a source of periodically pulsating potential in circuit therewith, the combination comprising electric discharge valve means of the arc-like type interposed in circuit between said source and capacitor for controlling the supply of charging current to said capacitor, a control circuit connected to said valve means and arranged to render said valve means conductive when a potential greater than a predetermined critical value is impressed therein in a positive pulsation of said source, and means responsive to the potential charge on said capacitor and adapted to impress in said control circuit a potential which first rises above said critical value at substantially the same instant early in each positive pulsation while the capacitor potential is below a second preselected magnitude less than said first preselected magnitude and at an instant gradually later in each succeeding positive pulsation as the capacitor potential increases from said second preselected magnitude to said first preselected magnitude and which does not rise above said critical value when said capacitor potential is at said first preselected magnitude.

7. For use in charging a capacitor to a potential of a preselected magnitude from a source of periodically pulsating potential in circuit therewith, the combination comprising electric discharge valve means of the arc-like type interposed between said source and capacitor for controlling the supply of charging current to said capacitor, a control circuit connected to said valve means and arranged to render said valve means conductive when a potential greater than a predetermined critical value is impressed therein in a positive pulsation of said source, and means adapted to impress in said control circuit a second periodic potential of the same frequency as said source and having a sloping wave front superimposed on a third potential which is substantially constant while the capacitor potential is below a second preselected magnitude less than said first preselected magnitude and which gradually decreases as said capacitor potential increases above said second preselected magnitude, the magnitude of said second and third potentials being such that the resultant potential first rises above said critical value at substantially the same instant early in each positive pulsation while said third potential is substantially constant and at an instant gradually later in each succeeding positive pulsation as said third potential decreases, said last means including means responsive to said capacitor potential for decreasing said third potential at a rate dependent upon the rate of increase of said capacitor potential in such manner that the resultant potential does not rise above said critical value when the capacitor potential is at said first preselected magnitude.

8. Apparatus according to claim 7 in which the means responsive to said capacitor potential for decreasing said third potential comprises electronic amplifying means in circuit with said capacitor and effective to amplify changes in the capacitor potential above said second preselected magnitude only.

9. In combination, a capacitor, means adapted to function as a source of first periodically pulsating potential in circuit with said capacitor for supplying charging current thereto, electric discharge valve means of the arc-like type interposed between said source and capacitor for controlling the supply of charging current to said capacitor, control means associated with said valve means and comprising an electronic amplifying device having a pair of principal electrodes and a control electrode, an input circuit extending from said control electrode to one of said principal electrodes and including a resistance, means for impressing in said input circuit a second substantially constant potential of one polarity tending to make said control electrode positive, means for impressing in said input circuit a third potential of opposite polarity having a magnitude proportional to the potential charge on said capacitor whereby current flows in said input circuit when the resultant potential therein is of said one polarity, said resistance being of such dimensions that the potential between said control electrode and one principal electrode remains substantially constant while the resultant potential impressed in the input circuit is of said one polarity and varies in accordance with variations in said capacitor potential when said resultant potential is of said opposite polarity, means for adjusting the magnitude of said second potential so that the resultant potential remains of said one polarity until said capacitor potential attains a preselected magnitude, an output circuit connected across said principal electrodes and including means adapted to function as a source of a fourth substantially constant potential so that current flow therethrough varies according to variations in the potential between said control and said one principal electrode, and means responsive to said output circuit current for rendering said valve means conductive at an instant in each period of said first source depending upon the magnitude of said output circuit current.

10. In combination, a capacitor, means adapted to function as a source of polyphase alternating potential in circuit with said capacitor for supplying charging current thereto, rectifying means including an electric discharge valve of the arc-like type interposed between each phase of said source and said capacitor to control the supply of current of that phase to the capacitor, and control means for said valves comprising means arranged to render each valve conductive at an instant early in each positive half period of the corresponding phase potential and means associated with said last means and responsive to the potential charge on said capacitor for causing each of said valves to be rendered conductive at an instant gradually later in each succeeding positive half period of the corresponding phase potential as said capacitor potential increases above a preselected magnitude.

11. In combination, a capacitor, means adapted to function as a source of polyphase alternating potential in circuit with said capacitor for supplying charging current to said capacitor, rectifying means including an electric discharge valve of the arc-like type interposed between each phase of said source and said capacitor to control the supply of current of that phase to the capacitor, each of said valves having a plurality of principal electrodes and a control electrode and adapted to be rendered conductive when a potential greater than a predetermined critical value is impressed between said control electrode and one of said principal electrodes in a positive half period of the corresponding phase potential, means adapted to impress between said control electrode and one principal electrode of each valve a second alternating potential of the same frequency as said corresponding phase potential and having a sloping wave front, and means responsive to the potential charge on said capacitor for also impressing between said control electrode and one principal electrode of each valve a third potential which is substantially constant while the capacitor potential is below a preselected magnitude and which gradually decreases as the capacitor potential increases above said preselected magnitude, the magnitude of said second and third potentials being such that the total potential impressed between said control electrode and one principal electrode first rises above said critical value at substantially the same instant early in each positive half period of the corresponding phase potential while said third potential is substantially constant and at an instant gradually later in each succeeding positive half period as said third potential decreases.

12. In combination, a capacitor, means adapted to function as a source of current in circuit with said capacitor for supplying charging current thereto, valve means interposed between said source and capacitor for controlling the supply of charging current to said capacitor, control means responsive to the potential charge on said capacitor for controlling the conductivity of said valve means so that said valve means is conductive when said capacitor potential is below a preselected magnitude and non-conductive when said capacitor potential is above said preselected magnitude, a normally open discharge circuit connected across said capacitor, means for effecting closing of said discharge circuit until said capacitor is discharged, said discharge circuit reverting to its open condition after said capacitor is discharged, and timing means rendered operable by said closing means and associated with said control means to prevent said valve means from becoming conductive for a predetermined time interval following the closing of said discharge circuit.

13. In combination, a capacitor, means adapted to function as a source of current in circuit with said capacitor to supply charging current thereto, valve means interposed between said source and capacitor for regulating the magnitude of said charging current, control means associated with said valve means and responsive to the impression thereon of a potential less than a first predetermined magnitude to cause said valve means to permit a supply of charging current at a substantially constant magnitude and responsive to the impression thereon of a potential greater than said first predetermined magnitude to effect variation of said charging current magnitude inversely as said impressed potential in such manner that said charging current recreases to zero when said impressed potential obtains a second predetermined magnitude, means for impressing on said control means a potential which varies according to the charge on said capacitor whereby said capacitor is charged to a magnitude corresponding to said current decreases to zero when said impressed potential, a normally open discharge circuit connected across said capacitor, means for effecting closing of said discharge circuit until said capacitor is discharged, said discharge circuit reverting to its open condition after said capacitor is discharged and timing means rendered operable by said closing means and associated with said control means to prevent said valve means from becoming conductive for a predetermined time interval following the closing of said discharge circuit.

14. Apparatus according to claim 13 in which said timing means comprises means initiated by said closing means for impressing an additional potential on said control means of such magnitude during said predetermined interval of time that the total potential impressed on said control means is above said second predetermined magnitude.

15. Apparatus according to claim 13 in which said timing means comprises means initiated by said closing means for impressing an additional potential on said control means of such character that the total potential impressed on said control means remains above said second predetermined magnitude for said predetermined interval of time, said additional potential decreasing gradually to zero following expiration of said predetermined time interval whereby recharging of said capacitor is initiated with a relatively low magnitude of charging current to avoid large transients.

16. In combination, a capacitor, means adapted to function as a source of periodically pulsating potential for supplying charging current to said capacitor, electric discharge valve means of the arc-like type interposed between said source and capacitor for controlling the supply of charging current to said capacitor, control means for rendering said valve means conductive at substantially the same instant early in each positive pulsation of said source, circuit means associated with said control means and effective upon the application thereto of a potential the magnitude of which is between a first preselected value and a second preselected value greater than said first value to cause said control means to render said valve means conductive at an instant later in a positive pulsation, the greater the applied potential the later the instant, and to prevent said control means from rendering said valve means conductive when the applied potential is above said second value, means for applying to said circuit means a second potential which varies in accordance with the potential charge on said capacitor, a normally open discharge circuit for said capacitor, means operable after said capacitor is charged to temporarily close said discharge circuit to discharge said capacitor, and means initiated by said closing means for applying to said circuit means a third potential of such character that the resultant potential magnitude is above said second value for a predetermined time interval during which said capacitor is discharged and which third potential thereafter decreases gradually but rapidly to zero in such manner that the resultant potential magnitude gradually decreases below said second value, whereby said valve means is rendered conductive late in a positive pulsation and thereafter gradually earlier in succeeding positive pulsations until said resultant potential is below said first value and then at substantially the same instant in each positive pulsation until said second potential reaches said first value and then at an instant gradually later in each succeeding positive pulsation until said second potential attains said second value.

17. The combination according to claim 16 in which the means for applying the third potential includes a second capacitor connected to be charged from said source simultaneously with said first capacitor, means operable by said closing means for discharging said second capacitor, and means for developing a potential proportional to the discharge current from said capacitor.

18. For use in supplying power to a reactive load, the combination comprising a capacitor in circuit with said load, a first ignitron connected in series between said capacitor and load, means connected across said capacitor for charging said capacitor, means for rendering said first ignitron conductive to discharge said capacitor through said load, a second ignitron having a pair of principal electrodes connected in parallel relation with said load and capacitor to conduct current resulting from the potential produced by a decay of the magnetic flux in said load after said capacitor is discharged, said second ignitron also having an ignition electrode, an electric discharge valve of the type which becomes conductive when a potential of a relatively low magnitude is impressed thereacross, also connected in parallel relation with said load, said valve becoming conductive when said potential produced by the flux decay attains said relatively low magnitude, an auxiliary source of current, and means responsive to current flowing through said valve for conductively connecting said auxiliary source between said ignition electrode and one of said principal electrodes to render said second ignitron conductive.

19. Apparatus according to claim 18 in which said last means comprises a second electric discharge valve of the arc-like type connected in circuit with said auxiliary source between said ignition electrode and said one principal electrode, and control means connected to said second valve and including biasing means normally tending to prevent said second valve from becoming conductive, said control means also including means responsive to current flowing through said first-named valve for counteracting said biasing means and thereby causing said second valve to become conductive.

20. For use in supplying power intermittently to a reactive load, the combination comprising a capacitor in circuit with said load, a first electric discharge valve of the arc-like type connected in series between said capacitor and load, means in circuit across said capacitor for charging it to a preselected potential, control means operable to render said first valve conductive to effect discharge of said capacitor through said load, first-timing means initiated by said control means at the same time said first valve is rendered conductive for rendering said charging means ineffective for a first predetermined time interval thereafter, a second electric discharge valve of the arc-like type connected in shunt across said load, means responsive to the potential across said load resulting from the decay of magnetic flux therein after said capacitor is discharged therethrough for rendering said second valve conductive, said second valve being arranged to conduct the current produced by said load potential and thereby cause said first valve to become non-conductive and second timing means initiated by said load potential responsive means for effecting operation of said control means a second predetermined time interval after said second valve is rendered conductive, said first and second timing means being so adjusted that said first interval does not expire until after said capacitor is discharged and said second interval does not expire until after said capacitor is recharged.

21. In combination, a capacitor, means adapted to function as a source of periodically pulsating potential in circuit with said capacitor for supplying charging current thereto, valve means interposed between said source and capacitor, control means for said valve means tending to cause said valve means to permit a supply of charging current of a substantially constant predetermined magnitude, means associated with said control means and responsive to the voltage across said capacitor for causing said valve means to reduce the magnitude of said charging current gradually as said capacitor voltage increases above a preselected value with said charging current being reduced to zero at a second predetermined value of capacitor voltage, a normally open discharge circuit connected across said capacitor, means for effecting closing of said discharge circuit to substantially discharge said capacitor, said discharge circuit reverting to the open condition after said capacitor is substantially discharged, and means rendered operable by said closing means and associated with said control means for causing said valve means to prevent the supply of charging current for a predetermined time interval and thereafter effect a gradual increase of said charging current to said predetermined magnitude.

22. In combination, a capacitor, means adapted to function as a source of periodically pulsating potential in circuit with said capacitor for supplying charging current thereto, electric discharge valve means of the arc-like type interposed between said source and capacitor, control means connected to said valve means for rendering said valve means conductive at substantially the same instant early in each positive pulsation of said source, means associated with said control means and responsive to the voltage across said capacitor for causing said valve means to be rendered conductive at an instant gradually later in each succeeding positive pulsation as said capacitor voltage increases above a preselected value, a normally open discharge circuit connected across said capacitor, means for effecting closing of said discharge circuit to substantially discharge said capacitor, said discharge circuit reverting to said open condition after said capacitor is substantially discharged, and means rendered operable by said closing means and associated with said control means for preventing said valve means from becoming conductive for a predetermined time interval and thereafter causing said valve means to be rendered conductive gradually earlier in successive positive pulsations from an instant late in a positive pulsation to said instant early in a positive pulsation.

CLYDE E. SMITH.
CLARENCE B. STADUM.